Nov. 29, 1966 H. W. KENT ETAL 3,288,301
PRINTED CIRCUIT CARD FRAME
Filed Nov. 6, 1964

INVENTORS
HARRY W. KENT,
BERNARD H. FRANCE
&DELBERT L. LIKENS

BY Hurvitz & Rose
ATTORNEYS

United States Patent Office 3,288,301

Patented Nov. 29, 1966

3,288,301

PRINTED CIRCUIT CARD FRAME

Harry W. Kent, Bernard H. France, and Delbert L. Likens, all of Eau Gallie, Fla., assignors to Radiation Incorporated, Melbourne, Fla., a corporation of Florida

Filed Nov. 6, 1964, Ser. No. 409,449
6 Claims. (Cl. 211—41)

The present invention relates generally to printed circuit card frames and more particularly to frames of interlocking construction for holding printed circuit cards in spaced relationship and in fixed, substantially vibration-proof relation.

Prior art card frames have had at least two marked disadvantages: first, their incapability of ready adaption to support printed circuit cards of varying standard sizes, and secondly, their faliure to eliminate or to adquately damp vibrations, the latter resulting in undue circuit noise and ultimately, in hair line cracking of the cards.

Briefly, and in accordance with the present invention, the aforementioned disadvantages of prior art printed circuit card frames have been overcome by provision of an enclosure comprising a plurality of elongated body members, each body member including first and second end elements extending longitudinally thereof, the first element being a tongue portion, and the second element being a grooved portion, the tongue portion being arranged to mate with the grooved portion of the next adjacent body member in an interlocking configuration to form the walls of the enclosure, and each body member further having at least one slot extending longitudinally along a side thereof, the slotted side being arranged to be disposed interiorly of the enclosure and adapted to accept an end of a circuit card. Each card is securely disposed between opposed interior surfaces of the enclosure and yet is slidably removable from the slots therein. The described enclosure is of rigid construction retaining any desired number of printed circuit cards in a substantially vibration-proof assembly. Further, the body members may be of standardized dimensions as to permit rapid construction of card frames of varying sizes for use with any of the common card sizes. That is, the need for carrying an inventory of card frames of several sizes is obviated, since any desired frame size may easily be constructed by simply varying the number of standard body portions employed, as required.

Accordingly, it is a principal object of the present invention to provide an improved printed circuit card frame.

It is a further object of the present invention to provide a printed circuit card frame of interlocking construction for removable retention of circuit cards in substantially vibration-proof assembly.

Another object of the present invention is to provide standard interlocking frame members for rapid construction of printed circuit card frames of varying dimensions in accordance with the varying dimensions of the circuit cards to be retained.

Figure 1:
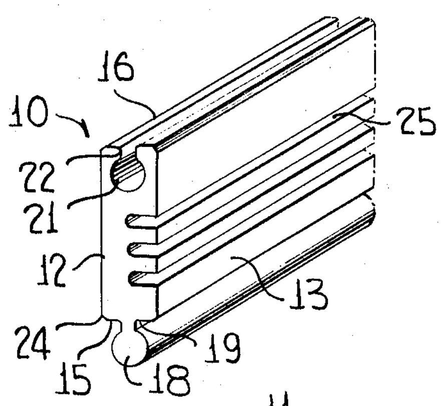
Figure 2:
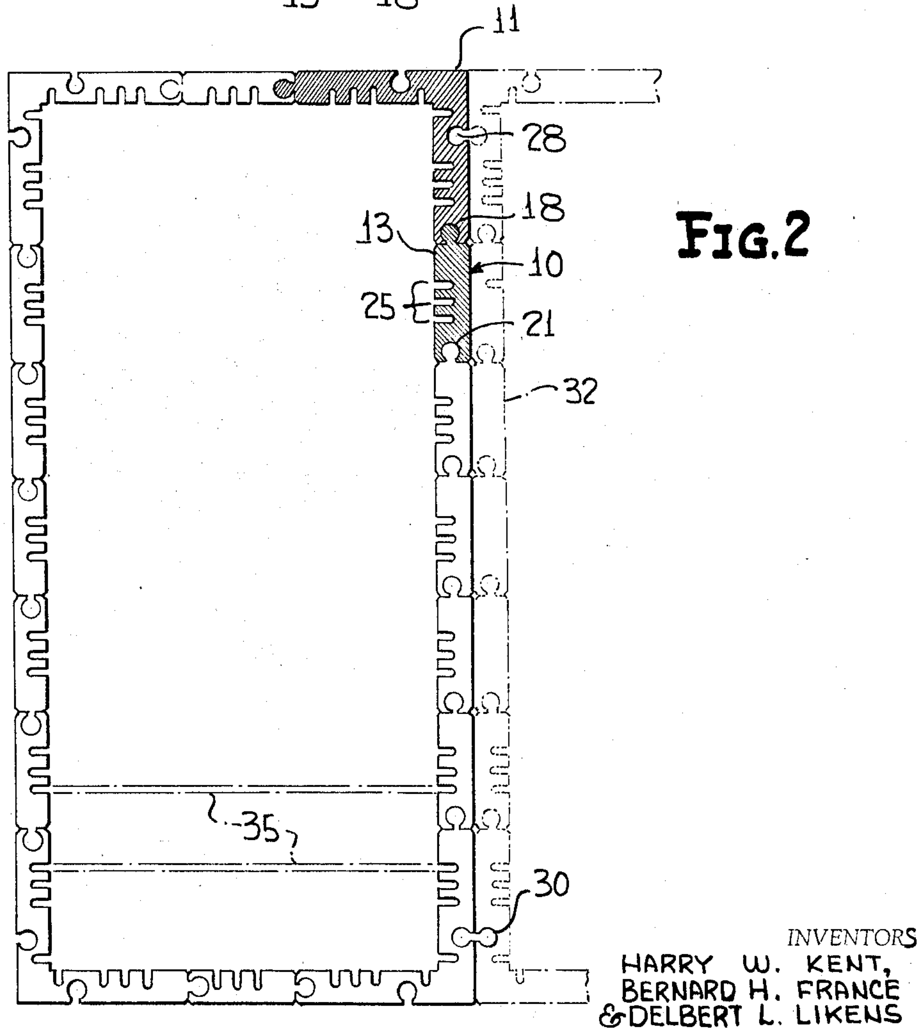

Still further objects, features, and attendant advantages of the present invention will become apparent from a consideration of the following detailed description of a specific embodiment thereof, taken in conjunction with the accompanying drawings, wherein:

FIGURE 1 is a fragmentary perspective view of a typical body member for a printed circuit card frame in accordance with the present invention; and FIGURE 2 is a cross-sectional view of a printed circuit card frame enclosure in an interlocked configuration of body members.

Referring now to the drawings, wherein like reference numerals designate like elements in the several views, FIGURE 1 illustrates a body member, generally designated at 10, having a pair of substantially parallel sides 12, 13, and a pair of opposed ends 15, 16. The body member is preferably extruded of aluminum, but may alternatively be extruded plastic, such as polystyrene, or any other suitable material. It will, of course, be understood that the frame, and thus each body member, should desirably be of relatively light weight.

Projecting from end 15 and extending longitudinally therewith is a male element or tongue portion 18 which joins the end 15 along a constricted region 19. At opposite end 16 is a female groove or rabbet 21 extending longitudinally therewith and also terminating in a constricted region 22. The rabbet is of slightly greater dimensions than corresponding portions of male element 18. Each of the end corners may be beveled, as at 24, for a purpose which will subsequently be discussed.

One or more longitudinal slots 25 is provided in side 13 to a depth approximately midway between the sides. The entire shaping of body member 10 may be preformed in the extrusion process in a well known manner to permit fabrication of each frame piece in a standard and relatively inexpensive fashion. Each slot 25 has a width sufficient to accept a printed card and will thus be formed in accordance with standard card thickness.

Referring now to FIGURE 2, a printed circuit card frame is constructed of a plurality of body members 10, the tongue portion 18 of each member being arranged to slidably mate with rabbet 21 of each adjacent member. The side walls of the enclosure may thus be extended to any reasonable length to house a desired number of printed circuit cards by simply adding an appropriate number of body members. If metal members, such as aluminum, are used each tongue and groove joint may be staked after assembly to prevent relative sliding between members of the completed enclosure. Any conventional staking operation may be used, with the beveled corners 24 of each member acting as a guide therefor.

If plastic members are employed, the frame may be provided with the necessary rigidity by insertion of a small amount of light viscosity polystyrene glue, for example, into each groove 21, either before or after the coupling of adjacent members.

Corner members 11 are fabricated in a manner similar to that employed for body members 10, except that each provides an approximately 90° corner for coupling the four side walls. It will be realized that the printed circuit card frame of the present invention is thus formed of only two basic extruded members or units, resulting in a considerable reduction in inventory and cost since a frame may rapidly and readily be constructed for any of the standard sizes of printed circuit cards.

With these considerations in mind a host of variations will immediately become apparent. For example, in FIGURE 2, each member is provided with three slotted protions 25 in spaced relationship. In this manner, the printed circuit cards, shown in phantom at 35 for example, may be separated at intervals according to height and number of components thereon. The slots are arranged to permit removable insertion of each circuit card or board into the frame in a secure engagement.

To further reduce vibration and its deleterious effects upon the printed circuit boards which might otherwise occur when the frames are mounted in moving vehicles or adjacent moving machine parts, each board may be additionally secured in place by an end crimping operation. The cards will thus remain removable from their individual slots but will not be subjected to the usually encountered resonant vibrations.

In many instances it is desirable to provide a modular assembly of card frames whereby individual frames may be rendered removable while maintaining overall compactness of mounting. To this end, grooves or sockets 28 may be provided at intervals in the exterior wall of the frame, and arranged to receive elongated double ball extrusions, such as is illustrated at 30. Thus two or more frames may be coupled, a second frame shown in phantom at 32, where restictions are imposed upon available mounting space and/or where it is desired to maintain rigidity throughout the mounted assembly. Each frame may also be provided with removable end plates or dust covers.

Having described and illustrated an embodiment of our invention, it will be apparent that various changes and modifications may be resorted to without departing from the true spirit and scope thereof. We therefore desire that the present invention be limited only by the appended claims.

We claim:

1. A printed circuit card frame comprising a plurality of members securely engaged to form a rigid interlocking enclosure, each of said members including substantially parallel, flat surface portions for establishing exterior and interior walls of said enclosure, and each having a pair of longitudinal end portions, a male element projecting from one of said end portions and longitudinally coextensive therewith, a longitudinally extending groove in the other of said end portions, said groove arranged to accept the male element of the next adjacent member, and each member further including means along said interior surface portions for removable engagement of printed circuit cards.

2. The combination according to claim 1 wherein said means comprises a longitudinal slot in said interior surface portion.

3. The combination according to claim 1 wherein said means comprises a plurality of substantially parallel longitudinal slots in said interior surface portion.

4. The combination according to claim 1 wherein said exterior walls of said enclosure include further longitudinal grooves arranged for coupling adjacent card frames via mating male elements.

5. A printed circuit board holder comprising a plurality of body members each having a pair of substantially parallel surfaces adapted to form interior and exterior wall portions of said holder, each of said members including longitudinal end portions having means for mating with end portions of adjacent members in interlocking relationship, said members further including means disposed along said surfaces adapted to form interior walls, for engaging printed circuit boards in adjustable spacing relation.

6. A printed circuit card frame, comprising a pair of substantially parallel side walls; top and bottom walls substantially parallel to one another and coupled respectively to opposite longitudinal ends of said sidewalls to form an open-ended rectangular enclosure; each of said walls comprising a plurality of longitudinal body members; each of said body members having a tongue element projecting from and coextensive with one longitudinal end thereof, and a groove within and coextensive with the opposite longitudinal end thereof; each of said tongue element and said groove of each of said body members having a constricted portion extending longitudinally adjacent the respectively associated end; said body members being arranged in longitudinal end-to-longitudinal end relationship with the tongue element of each body member slidably mated with the groove in the adjacent body member; at least one of the body members of each side wall containing a longitudinally extending slot along the surface forming the interior surface of the respectively associated side wall to provide a pair of opposing slots for slidably accepting a printed circuit card within said enclosure.

References Cited by the Examiner

UNITED STATES PATENTS

| | | | |
|---|---|---|---|
| 792,979 | 6/1905 | Fulghum | 20—92 |
| 891,110 | 6/1908 | Stevens | 312—234.4 |
| 1,695,553 | 12/1928 | Jones et al. | 52—285 |
| 2,011,962 | 8/1935 | Wheatley | 217—8 |
| 2,302,181 | 11/1942 | Bruce | 20—8 |
| 2,866,235 | 12/1958 | Couse et al. | 20—15 |
| 3,070,234 | 12/1962 | Deitchman | 211—10 |

CLAUDE A. LE ROY, *Primary Examiner.*

W. D. LOULAN, *Assistant Examiner.*